Figure 1:
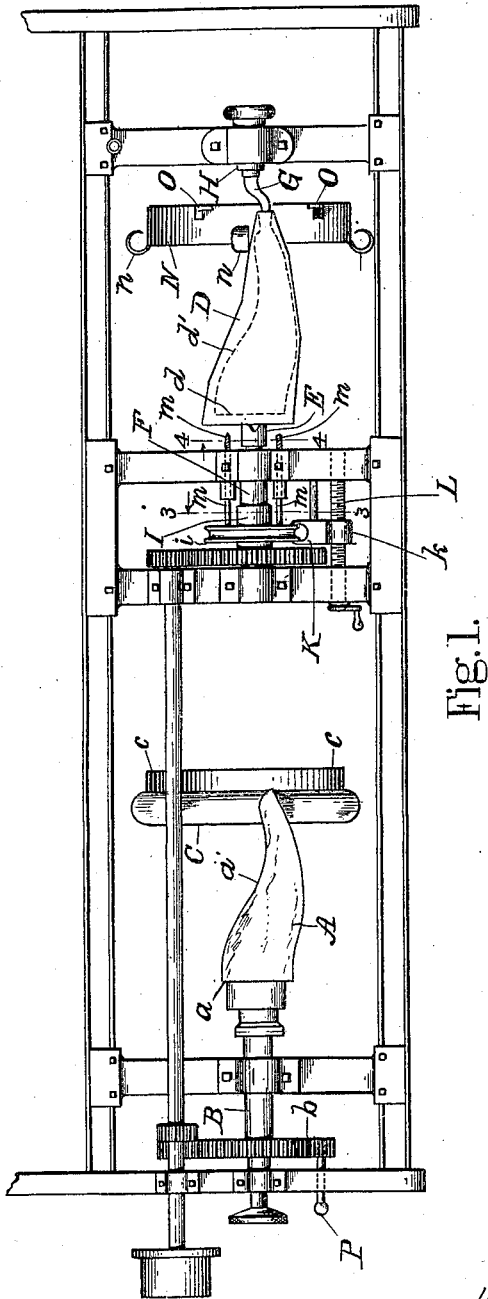

E. J. PRINDLE.
METHOD OF FORMING LASTS OR LAST PARTS.
APPLICATION FILED OCT. 17, 1910.

993,405.

Patented May 30, 1911.
3 SHEETS—SHEET 1.

WITNESSES:

INVENTOR:

E. J. PRINDLE.
METHOD OF FORMING LASTS OR LAST PARTS.
APPLICATION FILED OCT. 17, 1910.

993,405.

Patented May 30, 1911.

3 SHEETS—SHEET 2.

WITNESSES
Marian Meikle
Minerva Lobel

INVENTOR
Edwin J. Prindle

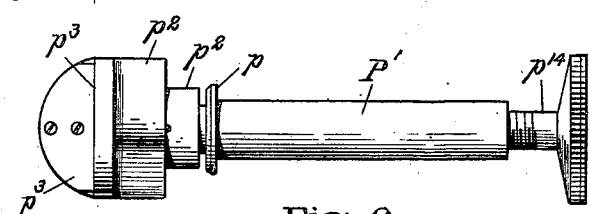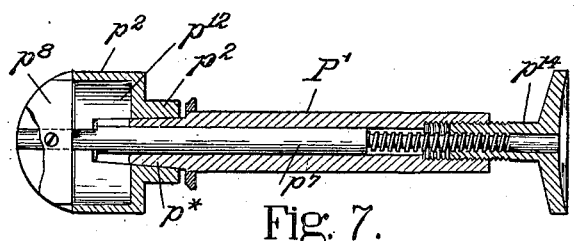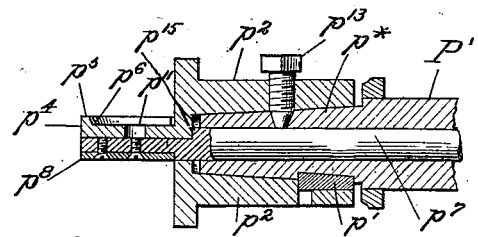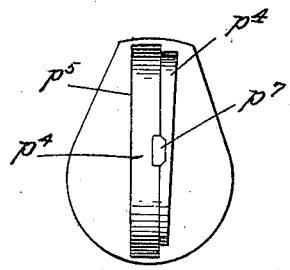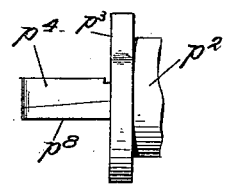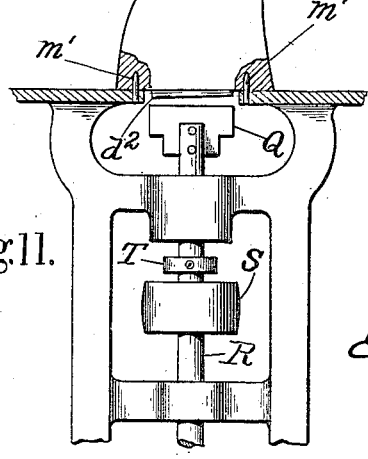

UNITED STATES PATENT OFFICE.

EDWIN J. PRINDLE, OF EAST ORANGE, NEW JERSEY, ASSIGNOR TO UNITED SHOE MACHINERY COMPANY, OF PATERSON, NEW JERSEY, A CORPORATION OF NEW JERSEY.

METHOD OF FORMING LASTS OR LAST PARTS.

993,405. Specification of Letters Patent. Patented May 30, 1911.

Application filed October 17, 1910. Serial No. 587,467.

*To all whom it may concern:*

Be it known that I, EDWIN J. PRINDLE, a citizen of the United States, residing at East Orange, in the county of Essex and State of New Jersey, have invented certain Improvements in Methods of Forming Lasts or Last Parts, of which the following description, in connection with the accompanying drawings, is a specification, like reference characters on the drawings indicating like parts in the several figures.

Figure 2:
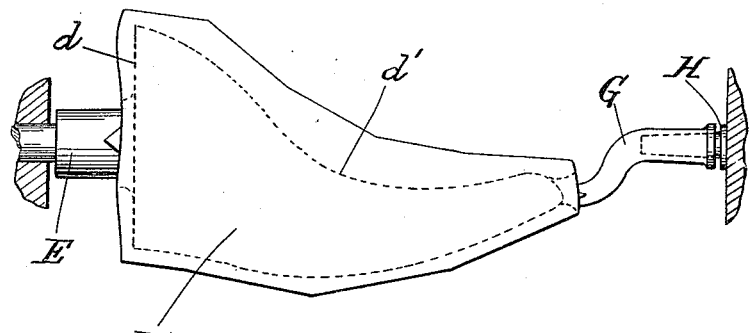
Figures 3, 4, 5:
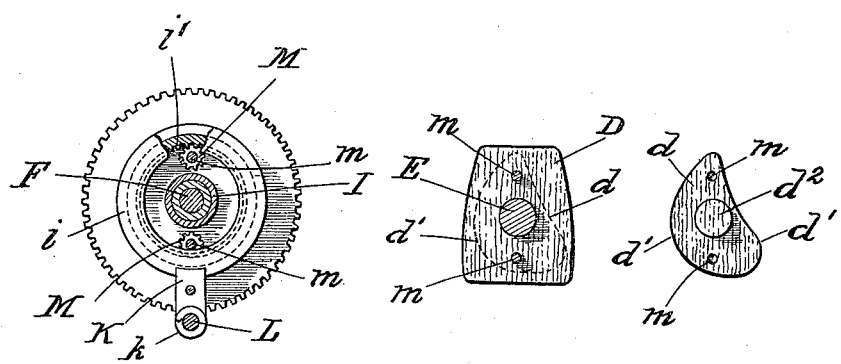

Figure 1 is a side elevation of the essential features of a last lathe adapted for carrying out my invention; Fig. 2 is a side elevation, on a larger scale, of the block and the means for supporting it; Fig. 3 is a sectional view taken on the line 3—3 of Fig. 1, looking in the direction of the arrows; Fig. 4 is a sectional view taken on the line 4—4 of Fig. 1, looking in the direction of the arrows; Fig. 5 is a rear view of the fore-part as it leaves the lathe; Figs. 6 to 10 are views of the chuck or dog used to hold the model on the head stock spindle of the lathe, and Fig. 11 is a vertical sectional view of a machine adapted to remove the stub on the fore-part.

The object of my invention has been to provide a method of turning lasts and last parts so that the abutting or other regular surfaces of the last parts shall bear a definite relation to the foot shape contours thereof, so that the parts of the last when assembled shall have precisely the desired relation and together shall form a last of precisely the desired contour, and particularly to form fore-parts so accurately that they can be used interchangeably, and to these ends, my invention consists in the method of forming lasts, hereinafter specified.

As my invention can be clearly illustrated in its application to the reproduction of the interchangeable fore-part shown in my United States Patent No. 648,525, granted May 1, 1900, to which reference is made for a full description of such part, I have selected for illustration and description the manufacture of such a fore-part by the practice of my method.

The model fore-part A can be supported in the lathe by means of any desired description. I have illustrated the model as supported by a chuck or dog which is fully described and claimed in my application for patent for improvements in and relating to lasts, No. 72,081, filed August 14th, 1901. Such chuck or dog is constructed as illustrated in Figs. 6 to 9, inclusive, and is mounted on a spindle consisting of a cylindrical body $P'$ which preferably has a fixed or integral collar $p$ formed near its forward end. The forward end $p^*$ of the spindle is tapered and is provided with a key $p'$. Upon the tapered end of such spindle the body $p^2$ of the dog for the fore-part is secured, such body having a tapering opening into which the tapered end of the spindle is adapted to be received. The body $p^2$ has a front surface $p^3$, which is preferably plain. Such surface is preferably formed at a right angle to the axis of the spindle. A plate $p^4$ projects perpendicularly from the surface $p^3$ and is sector-shaped. A flange $p^5$ projects from the edge of said plate, and the rear surface $p^6$ of the said flange is preferably inclined to said plate. A threaded rod $p^7$ passes through a bore in the spindle, and carries on its outer end a wedge $p^8$, which is sector-shaped. The rod $p^7$ is preferably flattened on its forward end, and is seated in a groove in the plate $p^4$. The wedge is also grooved to receive the flattened end of the rod $p^7$, and is secured to said rod as by means of two or more screws passing through both of said parts. In order to rivet the inner ends of said screws, an opening $p^{11}$ can be formed in the plate $p^4$, and said screws can be moved opposite said opening, so that their inner ends are exposed. A slot $p^{12}$ is formed in the head $p^2$ and in the tapered end of the spindle, which slot is large enough so that the wedge can be completely withdrawn to the rear of the surface $p^3$. The surface of the plate $p^4$ against which the wedge rests is preferably inclined away from the flange $p^5$ in a forward direction, and the adjacent face of the wedge is similarly inclined, so that, while the outer surfaces of the wedge and plate are parallel, the wedge rides outward laterally as it travels over the plate $p^4$. The wedge is also thicker at the top than at the bottom. A set screw $p^{13}$ is threaded into the shank of the head $p^2$, and engages the forward edge of a tapered hole in the tapered end of the spindle, so that the screwing up of the set screw tends to draw the head of the dog firmly to the tapered end of the spindle. The rear end of the rod is provided with a screw thread which is engaged by an internal thread formed within a sleeve $p^{14}$. The outer surface of said sleeve has a thread which is oppositely inclined to the thread on the rod $p^7$, and which engages a thread formed within a bore in the rear end of the spindle. The sleeve is provided with a hand wheel for operation. The plate $p^4$ is preferably formed upon the head $p^2$ in such a position that when a fore-part is held by the dog, it will bear the same relation to the axis of the spindle that it does in the last to a line parallel to the fore-part plate of the hinge and passing through the axis of the spindle hole. When the parts bear these relations, the dog can most conveniently be used to turn a left fore-part from a right model, and vice versa.

To assemble the parts of the before-described dog and spindle, the sleeve is preferably first screwed entirely into the spindle. The rod $p^7$ is then inserted in the bore of the spindle until its thread engages the internal thread of the sleeve, the head of the dog at the same time passing partly over the tapered end of the spindle. The sleeve is then turned to screw it out of the spindle, and, owing to the opposite inclination of the screw threads, the rod is drawn rearwardly into the sleeve as the sleeve moves rearwardly out of the spindle. This is continued until the engagement of the wedge with the rear end of the slot $p^{12}$ draws the head firmly on to the spindle. The set screw is then set up.

In order to take the dog off the spindle, the set screw is unscrewed, the sleeve is screwed into the spindle until a shoulder $p^{15}$ on the rod $p^7$ engages a shoulder on the inside of the head $p^2$. Further screwing in of the sleeve causes the rod $p^7$ to force the head $p^2$ off of the spindle, and at the same time disengages the rod from the sleeve so that the dog can be removed. In the use of the said dog and spindle to carry out my before-mentioned method, the wedge is completely withdrawn into its slot, so that it does not project forward beyond the face $p^3$. The fore-part is then passed over the plate $p^4$ until its rear surface rests upon the face $p^3$ of the dog. The fore-part is then moved laterally, until its arc-shaped groove is engaged by the flange $p^5$. The wedge is then forced forward, and as it rides up the incline on the plate $p^4$, it forces the fore-part laterally so as to force the flange $p^5$ into the arc-shaped groove in the fore-part, and the inclined rear surface $p^4$ on the flange forces the fore-part firmly back against the surface $p^3$. The fore-part is thus very securely locked upon the dog.

It will be seen that the model is supported entirely from its rear end, and by means which are wholly contained within the outlines of the last. The toe may be supported by a toe-dog, if desired. The model chuck or dog is illustrated as secured to a head stock spindle B, the latter being mounted in the ordinary swing frame of the last lathe. The model is adapted to bear against the ordinary guide-wheel, or model wheel C. The block D is supported at its rear end by an ordinary wood chuck E, mounted on a head stock spindle F, which is journaled in the swing frame in the ordinary manner. The toe of the block is supported by a toe-dog G, the latter being swiveled upon the ordinary tail stock spindle H, the end of the spindle being preferably tapered, and fitting a corresponding tapered hole in the dog G. A sleeve I is loosely journaled on the spindle F, and a pulley $i$ is formed on said sleeve. The pulley is embraced by a pair of fingers K carried by a nut $k$, the latter being threaded on a shaft screw L that is journaled in the block head stock, and is provided with a crank, or other means, for turning the same. An internal gear $i'$ is formed within the pulley $i$, and such gear meshes with pinions M that are secured upon the rear ends of drill spindles $m$ which have bearing in the head stock, and which preferably extend parallel to the spindle F. By turning the screw shaft, the pulley and drills can be moved toward the block while the pulley is being rotated, and holes $m'$ can thus be drilled in the rear end of the block. The cutter head N is of ordinary construction, and is provided upon its left-hand face with the ordinary cutters $n$. In addition to the cutters $n$, cutters O are secured to the head, such cutters preferably being L-shaped, so that they are adapted to cut a plane surface perpendicular to the axis of the spindle F. For convenience, I prefer to mount the model A so that its rear surface is perpendicular to the axis of the spindle B, since, in such position the rear surface $d$ of the fore-part to be formed will be perpendicular to the axis of the spindle F, and can readily be formed by means of the cutters O. When the model is thus supported, its toe will usually not be in the axis of the spindle B. The toe of the block will, therefore, not be in line with the axis of its spindle, and I therefore, form the dog G, so that it will meet the block at the point where the toe of the new fore-part will be formed. For convenience, a series of dogs G, of various curvature or off-set, are provided, so that one may be readily selected which shall have the desired degree of offset. One dog will be found to fit all sizes of lasts larger and smaller than the model, if it is of the proper shape to take the model size.

In carrying out my method, the model and block are supported in the lathe, as has been described. The foot-shape contour $d'$ of the last is then preferably first turned in the usual manner. This can be done either by causing the cutter to travel from the rear portion toward the toe of the block, or, as I prefer, from the toe toward the rear portion of the block. When such foot-shape contour has been completed, the cutter-head is so positioned that the right-hand end of the cutting edges of the cutters O is in the plane of the surfaces d of the last to be formed. If desired, this can be accomplished by forming a square shoulder c on the right-hand side of the model wheel in the same relation to the model wheel as the cutters O bear to the cutters n. The swing frame is then allowed to swing in while the cutters O form the surface d on the last being formed, the block meanwhile revolving on its axis. The surface d will then be in precisely the same relation to the foot-shape contour of the last being formed as is the rear surface a of the model to the foot-shape contour a' of the model. The swing frame is now preferably swung away from the model wheel and cutter, and the model is stopped in some definite position of rotation and is preferably held therein, as by a bolt engaging a hole in the gear b on the model spindle, such as the bolt P, shown in Fig. 1. The pulley i is then revolved, and the screw shaft L is turned. The drills m are thus caused to revolve and to approach the block, the holes m and m' are drilled in the rear end of the last being formed. The holes m' bear a definite relation to the hinge slot in the model A and may be engaged with fixed pins to maintain the last in fixed position while the stub $d^2$ is cut down to the plane of the surrounding surface. Thus the surface d is completed, and the hinged slot in the forepart can by the use of the holes m' on suitable pins on a slotting machine, be formed in exactly the desired relation to the surface d and to the foot-shape contour d' of the new fore-part, so that such fore-part will, if of the same size as the model, be interchangeable with the model, and if of a larger or smaller size, will be interchangeable with any proper reproduction of the model.

It is obvious that variations can be made in the above-described method which will come within the scope of my invention; for instance, the cutters n can easily be made to form the surface d as well as the foot-shape contour, and the cutters O thus dispensed with. If desired, the surface d on the rear end of the fore-part can first be finished and then the foot-shape contour can be subsequently finished.

In the United States Patent No. 912,027, granted to me February 9, 1909, I have described a process of making lasts or last parts which consists in first forming a geometrical surface on the block to correspond with a similar surface of the model, and in then forming the foot-shaped contour on the block in the same relation to its geometrical surface as the similar contour on the model bears to its geometrical surface. The generic idea which is common both to the said patent and to the species of the present application is not claimed herein, but is claimed in the said patent.

Having thus described my invention, what I claim as new and desire to secure by Letters Patent of the United States is:—

1. The method of forming a last or last parts having a geometrical surface and a foot-shaped contour, which consists in forming a similar surface and contour in the desired relation to each other on the model, placing the geometrical surface of the model in a definite relation to the axis of revolution, forming the foot-shaped contour on the block from which the last or last part is to be formed by revolving the model and block in a lathe, and guiding the cutter for such contour from the contour of the model, and forming the geometrical surface on the block by presenting a cutter to the block in the same relation to the axis of revolution of the block upon which it was turned when said contour was formed as the geometrical surface of the model bore to its axis of revolution.

2. The method of forming a last or last parts, which consists in forming a regular surface on the model, and in so supporting the model in the lathe that such surface shall have a predetermined relation to the axis of rotation, supporting a block in the lathe, causing a tool to cut said block in a path parallel to said predetermined position of said regular surface, and finishing the foot-shaped contour of the block by guiding a tool from the foot-shaped contour of the model.

3. The method of forming lasts or last parts which consists in forming a regular surface on a model and in so supporting the model in the lathe that such regular surface thereon shall have a predetermined relation to the axis of revolution, and finishing the corresponding surface on the last by a tool moved in a path parallel to the said surface.

4. The method of forming lasts or last parts, which consists in providing a model having a special regular surface corresponding to that desired and coming within the operative range of the model as a pattern, supporting the model in a lathe, and finishing the same surface on the last to be formed by moving a cutter in a definite relation to the surface on the model.

5. The method of forming lasts or last parts, which consists in providing a model with a plane surface, corresponding to that desired and coming within the operative range of the model as a pattern, supporting the model in the lathe, so that said plane surface shall be perpendicular to the axis of revolution in forming the foot-shape contour of the last, and then forming, on the work, a plane surface corresponding to the plane surface in the model by moving a cutter and the block relatively to each other in a direction perpendicular to the axis of revolution of the block.

6. The method of forming lasts or last parts, which consists in forming a plane surface corresponding to that desired, and coming within the operative range of the model as a pattern upon the model, supporting the model in the lathe, so that said plane surface shall be perpendicular to the axis of revolution, and then forming the foot-shape contour and a plane surface on the last to be formed.

7. The method of forming lasts or last parts, which consists in forming on the model a special regular surface, corresponding to that desired, and coming within the operative range of the model as a pattern, so supporting the model in the lathe that said surface shall have a predetermined relation to the axis of revolution, and finishing the corresponding surface on the last by a tool moved in a path having a predetermined relation to the axis of revolution.

8. The method of forming a last or last parts, which consists in forming a regular surface on the model, supporting the model and the block in the lathe by engagement with dogs, so that such surface shall have a definite relation to the axis of revolution, turning the foot-shaped contour on the block and forming a regular surface on the block corresponding to that on the model by supporting the block by its dog-engaging indentations, and cutting said surface on the block by a cutter moving in a path having the same relation to the axis of revolution upon which the foot-shaped contour was turned as had the regular surface of the model to the axis of revolution of the model.

9. The method of forming a last or last parts, which consists in forming a regular surface on the model, supporting the model so that such surface shall have a definite relation to the axis of revolution, turning a foot-shaped contour on a block from the corresponding contour on the model, and forming a regular surface on the block, while the block is supported by the surfaces by which it was supported during the turning, the tool forming such regular surface being guided in a path having the same relation to the axis of revolution of the block as the regular surface on the model had to the model's axis of revolution during the turning operation.

10. The method of forming a last or last parts, which consists in forming a plane surface on the model supporting the model in the lathe so that such surface shall be perpendicular to the axis of revolution, turning a foot-shaped contour on the block from the corresponding contour on the model, and forming a plane surface on the block by a cutter guided in a path perpendicular to what was the axis of revolution of the block during the turning operation.

11. The method of forming a last or last parts, having a geometrical surface and a foot-shaped contour, which consists in forming a similar surface and contour in the desired relation to each other on the model, supporting the model and the block in the lathe, turning the foot-shaped contour on the block, and while such block is in the lathe, forming marks on the block in a definite relation to the regular surface to be formed on the block, which surface is to correspond to the regular surface on the model, and using said marks to direct a tool in forming said regular surface on the block.

12. The method of forming a last or last parts, having a geometrical surface and a foot-shaped contour, which consists in forming a similar surface and contour in the desired relation to each other on the model, supporting the model and the block in the lathe, turning the foot-shaped contour on the block, and determining certain marks by the chucked position of the block in the lathe, in a definite relation to the regular surface to be formed on the block, corresponding to the regular surface on the model, which marks are used to position the block for the action of a tool in forming said regular surface on the block.

In testimony whereof I have signed my name to this specification in the presence of two subscribing witnesses.

EDWIN J. PRINDLE.

Witnesses:
MARIAN MEIKLE,
MINERVA LOBEL.